United States Patent
Wu et al.

(10) Patent No.: US 9,144,273 B2
(45) Date of Patent: Sep. 29, 2015

(54) BELT STRUCTURE

(71) Applicant: Wistron Corp., New Taipei (TW)

(72) Inventors: Wen-Chin Wu, New Taipei (TW); Yi-Sheng Kao, New Taipei (TW); Tsung-Hsien Tsai, New Taipei (TW)

(73) Assignee: WISTRON CORP., New Taipei (TW)

( * ) Notice: Subject to any disclaimer, the term of this patent is extended or adjusted under 35 U.S.C. 154(b) by 35 days.

(21) Appl. No.: 14/161,356

(22) Filed: Jan. 22, 2014

(65) Prior Publication Data

US 2015/0135410 A1 May 21, 2015

(30) Foreign Application Priority Data

Nov. 20, 2013 (TW) .............................. 102142277 A (51) Int. Cl.
| | | |
|---|---|---|
| *A44C 5/00* | (2006.01) | |
| *A45F 5/00* | (2006.01) | |
| *A44C 5/18* | (2006.01) | |
| *A44C 27/00* | (2006.01) | |

(52) U.S. Cl.
CPC ................. *A44C 5/18* (2013.01); *A44C 27/008* (2013.01); *A45F 2005/008* (2013.01); *C08L 2201/12* (2013.01)

(58) Field of Classification Search
CPC ................. A44C 27/008; A44C 27/003; A45F 2005/008
USPC .................................................. 224/164–179
See application file for complete search history.

(56) References Cited

U.S. PATENT DOCUMENTS

| | | | |
|---|---|---|---|
| 5,279,022 A * | 1/1994 | Giacomel .................... 24/703.1 |
| 6,675,610 B2 * | 1/2004 | Beard .................. 63/3 |
| 7,726,887 B2 * | 6/2010 | Su et al. ........................ 396/423 |
| 8,387,215 B2 * | 3/2013 | Koncelik, Jr. ............... 24/16 PB |
| 8,400,371 B2 * | 3/2013 | Kato et al. ....................... 345/8 |
| 8,732,914 B2 * | 5/2014 | Browne et al. ............. 24/30.5 T |
| 2004/0025984 A1 * | 2/2004 | Holemans et al. ........... 148/563 |
| 2004/0221614 A1 * | 11/2004 | Holemans et al. ................. 63/35 |
| 2005/0183412 A1 * | 8/2005 | Verdon et al. ..................... 59/80 |
| 2009/0126084 A1 * | 5/2009 | Fenske ................. 2/338 |
| 2010/0138002 A1 | 6/2010 | Mankame et al. |
| 2010/0243688 A1 * | 9/2010 | Gutierrez et al. ............. 224/175 |
| 2012/0174573 A1 | 7/2012 | Skurkis et al. |
| 2014/0267076 A1 * | 9/2014 | Birnbaum et al. ............ 345/173 |

FOREIGN PATENT DOCUMENTS

| | | |
|---|---|---|
| CN | 100374352 C | 3/2008 |
| CN | 102540859 A | 7/2012 |
| CN | 101813075 B | 6/2013 |
| CN | 103306924 A | 9/2013 |

OTHER PUBLICATIONS

TW Office Action dated Jun. 12, 2015 as received in Application No. 102142277 (English Translation).

* cited by examiner

*Primary Examiner* — Justin Larson
(74) *Attorney, Agent, or Firm* — Maschoff Brennan (57) ABSTRACT

A belt structure includes a belt, a shape memory alloys, a processing module, and a driving module, wherein the driving module is electrically connected to the processing module. The shape memory alloys is disposed in the belt. The processing module generates a controlling signal according to a triggering signal. The driving module generates a driving signal according to the controlling signal, and supplies the driving signal to the shape memory alloys such that the shape memory alloys is deformed.

12 Claims, 8 Drawing Sheets

BELT STRUCTURE

CROSS-REFERENCE TO RELATED APPLICATIONS

This non-provisional application claims priority under 35 U.S.C. §119(e) on Patent Application No(s). 102142277 filed in the Taiwan, R.O.C. on Nov. 20, 2013, the entire contents of which are hereby incorporated by reference.

TECHNICAL FIELD

This disclosure relates to a belt structure, more particularly to a belt structure with self-deformation ability.

BACKGROUND

With the development of technology, smart phones and tablet computers are being used very commonly nowadays. In order to enable users to conveniently and freely have access to weather information, time information, calendar, email service, and telephone service, many companies begins investing in the research of smart watches.

When users wear watches with conventional straps or belts, prongs at one end of the straps have to plug in holes at the other end of the straps in order to fit one end of the straps to the other to be secured on user's wrist. Moreover, the tightness for the strap on user's wrist can be adjusted by fitting the prong through holes at different locations on the strap.

However, since the distances between the holes on the strap have already been set, there are still limitations for users to adjust and obtain the most comfortable tightness for the strap. Also, if the prong has been fitted through a specific hole for a period of time, the hole may be enlarged. Thus, the prong may loose from the strap, and the watch may drop from user's wrist.

SUMMARY

According to an embodiment, a belt structure comprises a belt, a first shape memory alloy, a processing module, and a driving module. The processing module is electrically connected to the driving module. The first shape memory alloy is disposed in the belt. The processing module is used to generate a control signal according to a triggering signal. The driving module is used to generate a driving signal according to the control signal and provide the driving signal to the first shape memory alloy so that the first shape memory alloy is deformed.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1:
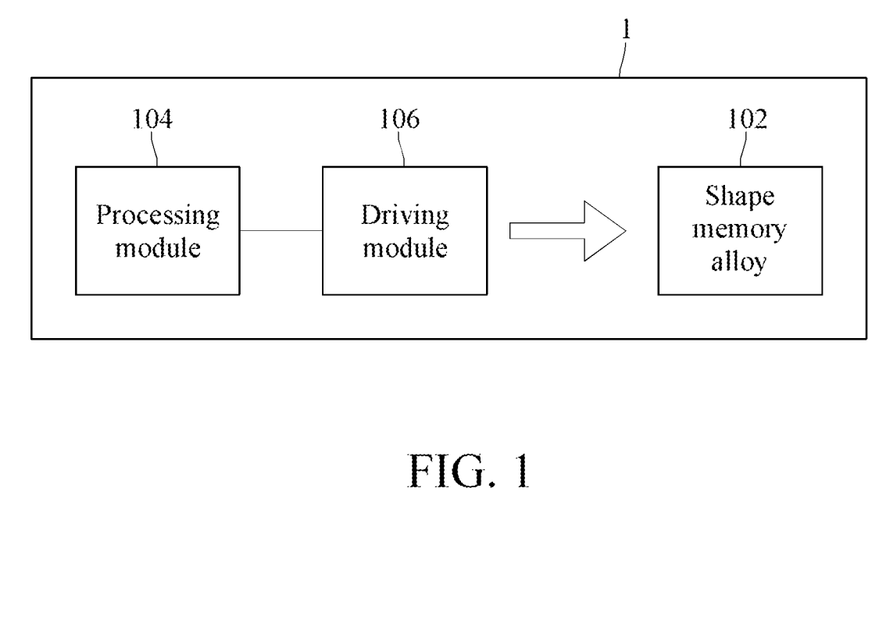
FIG. 1 is a block diagram of a belt structure in an embodiment of the disclosure.
Figure 2A:
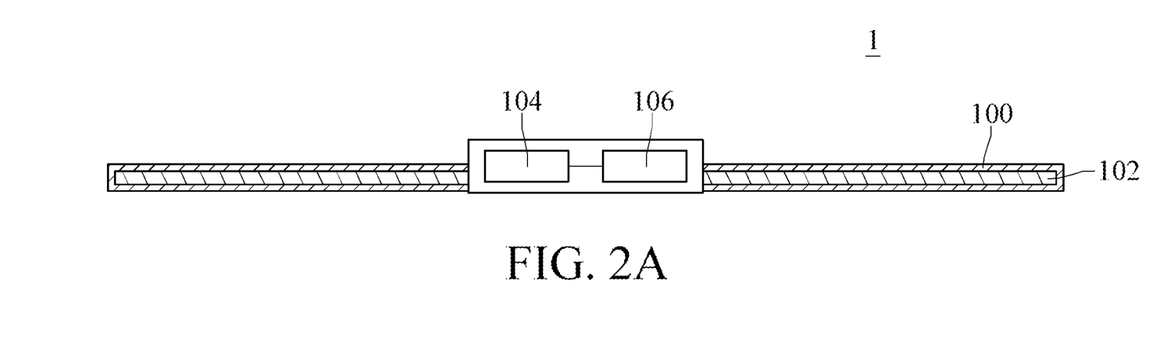
FIG. 2A is a lateral cross-sectional view of the belt structure in FIG. 1.
Figure 2B:
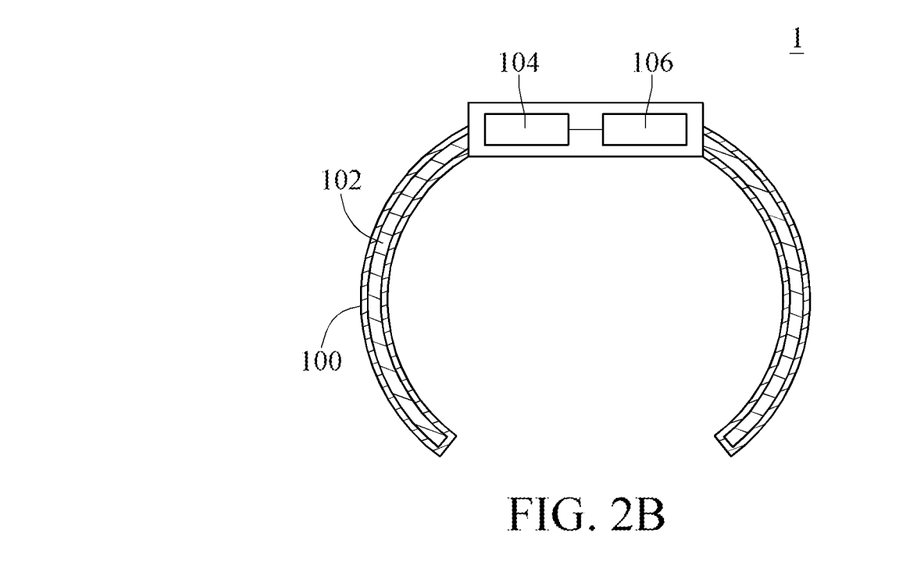
FIG. 2B is a lateral cross-sectional view of the belt structure in FIG. 2A deformed.

Referring to FIG. 1, FIG. 2A, and FIG. 2B, FIG. 1 is a block diagram of a belt structure in an embodiment of the disclosure; FIG. 2A is a lateral cross-sectional view of the belt structure in FIG. 1; and FIG. 2B is a lateral cross-sectional view of the belt structure in FIG. 2A deformed. As shown in FIG. 1 and FIG. 2A, the belt structure 1 comprises a belt 100, a shape memory alloy (SMA) 102, a processing module 104, and a driving module 106, wherein the processing module 104 is electrically connected to the driving module 106. The belt structure 1 is used to surround an object, and the belt structure 1 is, for example and not limited to, a watch strap, bracelet, wristband, laces, string, or other tightening device. The components of the belt structure 1 are illustrated below.

The belt 100 encloses the shape memory alloy 102 so that the shape memory alloy 102 can be fixed in the belt 100. The shape memory alloy 102 is, for example and not limited to, a nickel-titanium alloy, a copper-zinc alloy, a copper-aluminum-nickel alloy, a copper-gold-zinc alloy, an iron alloy, or a stainless steel alloy. Moreover, the disclosure does not have any limitations on the material of the belt 100 and the length proportion of the belt 100 and the shape memory alloy 102.

The processing module 104 is used to generate a control signal according to a triggering signal. The triggering signal indicates that the belt structure 1 is allowed to wrap around the object, or indicates the size of the object under wrapping, and the disclosure is not limited thereto. Also, the triggering signal may be an instruction that the user manually inputs, or an instruction generated when the belt structure 1 automatically detects the object.

The driving module 106 is used to generate a driving signal according to the control signal, and provide the driving signal to the shape memory alloy 102. Thus, the shape memory alloy 102 is deformed due to the phase transition, and then the belt 100 wraps around the object, as shown in FIG. 2B.

The driving module 106 is, for example and not limited to, a magnetic field generator which generates magnetic field (i.e. magnetic force) of different directions (i.e. the driving signal) which enables the shape memory alloy 102 to be deformed due to the change of direction of the magnetic field. In an exemplary embodiment, when the magnetic field generator generates a magnetic field of a first direction, the shape memory alloy 102 may have a linear shape shown in FIG. 2A due to the effect of the magnetic field of the first direction. Alternately, when the magnetic field generator generates a magnetic field of a second direction, the shape memory alloy 102 may have a curve shape shown in FIG. 2B due to the effect of the magnetic field of the second direction.

Furthermore, the driving module 106 may be a current driver. The current driver is used to deliver the driving current (i.e. the driving signal) to the shape memory alloy 102 so the shape memory alloy 102 may be heated because of the driving current inputted continuously. When the temperature of the shape memory alloy 102 reaches a phase transition temperature, the shape memory alloy 102 may return back to its original shape (or called as initial shape). Overall, the shape memory alloy 102 may be heated and deformed.

More specifically, when the current driver has not yet delivered the driving current to the shape memory alloy 102, or when the temperature of the shape memory alloy 102 has not yet reached the phase transition temperature, the shape memory alloy 102 is in the martensite status and has the linear shape shown in FIG. 2A. When the current driver continues to deliver the driving current to the shape memory alloy 102 and the temperature of the shape memory alloy 102 reaches the phase transition temperature, the shape memory alloy 102 is in austenite status (i.e. the shape memory alloy 102 returns back to the original shape) and has the curve shape shown in FIG. 2B. This phenomenon is called the shape memory effect (SME).

Furthermore, the disclosure does not have any limitations on the curve angle of the shape and the phase transition temperature of the shape memory alloy 102. The shape memory alloy 102 may have different shapes in the martensite and austenite status by going through reheating cycles. When the shape memory alloy 102 reaches the phase transition temperature and returns back to the original shape, the shape memory alloy 102 is deformed (non-linear deformation) because enduring a stress in a specific range under a temperature in a specific range, and then the shape memory alloy 102 returns back to the previous shape (original shape) by directly releasing the stress. That is, under a certain range of deformation, the shape memory alloy 102 may restore to its original shape due to its restoration stress (i.e. the internal stress). This phenomenon is called the pseudo elasticity effect or the super elasticity effect.

To more clearly illustrate the embodiments of the disclosure, the current driver is taken as an example of the driving module 106 in the following description, but the disclosure is not limited thereto.

Figure 3:
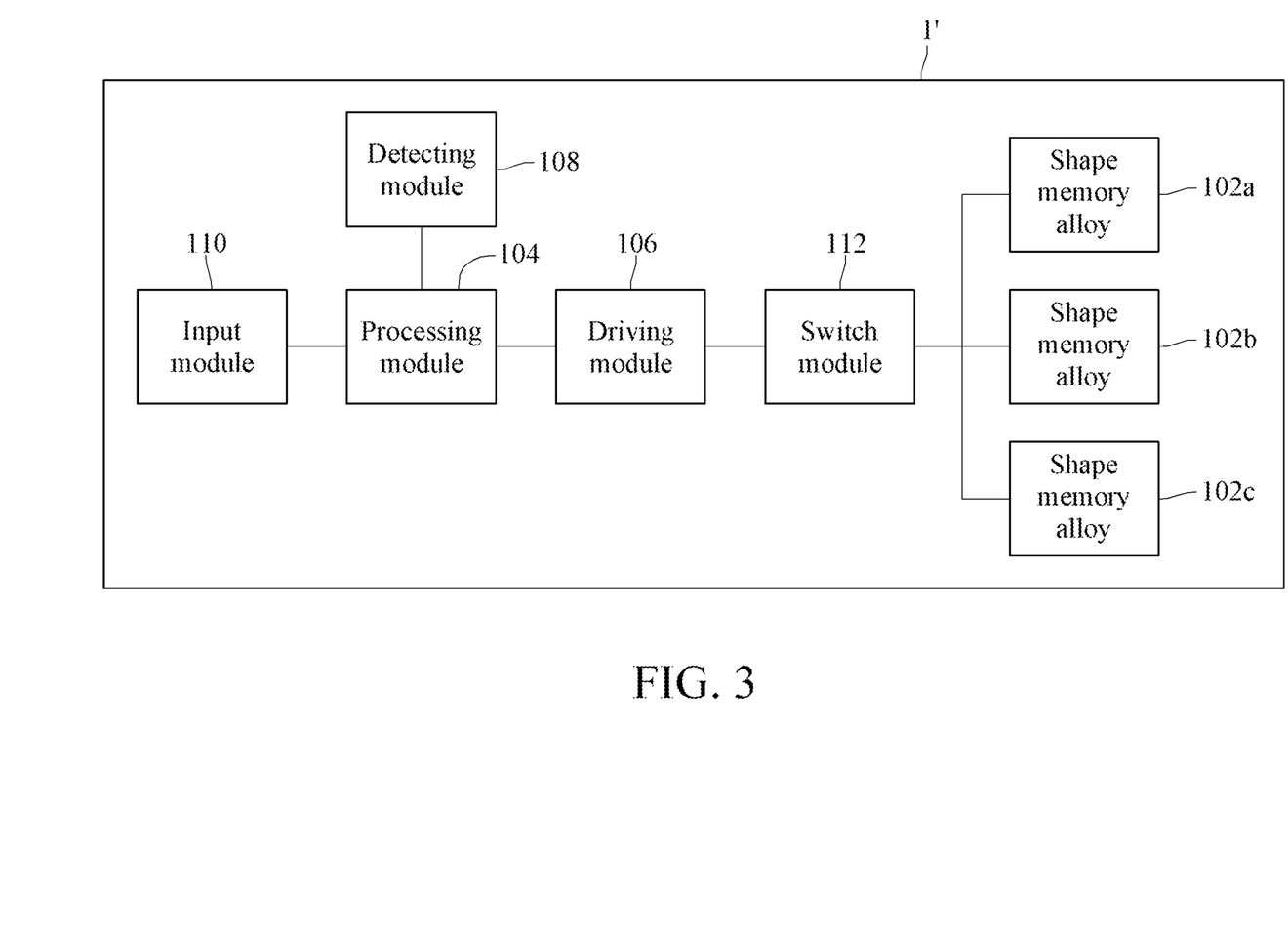
FIG. 3 is a block diagram of a belt structure in an embodiment of the disclosure.
Figure 4:
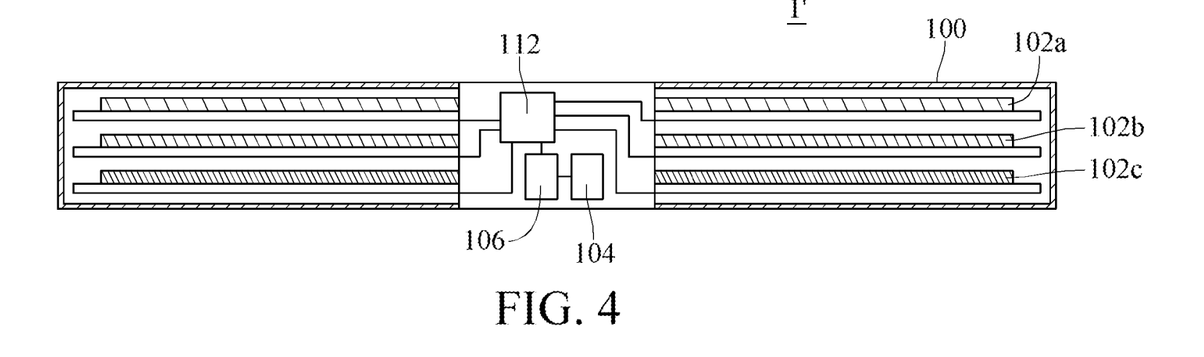
FIG. 4 is a vertical view of the belt structure in FIG. 3.

Referring to FIG. 3 and FIG. 4, FIG. 3 is a block diagram of a belt structure in an embodiment of the disclosure; and FIG. 4 is a vertical view of the belt structure in FIG. 3. As shown in FIG. 3 and FIG. 4, the belt structure 1' comprises a belt 100, shape memory alloys 102a to 102c, a processing module 104, a driving module 106, a detecting module 108, an input module 110, and a switch module 112, wherein the processing module 104 is electrically connected to the driving module 106, the detecting module 108, and the input module 110; and the switch module 112 is electrically connected to the driving module 106 and the shape memory alloys 102a to 102c. Since most of the components of the belt structure 1' are similar to those in the belt structure 1, and thus not illustrated hereinafter.

Compared with the belt structure 1, the belt structure 1' includes three shape memory alloys 102a, 102b, and 102c. The shape memory alloys 102a, 102b and 102c are disposed in the belt 100 and separated from each other. The lengths of the shape memory alloys 102a, 102b, and 102c are sufficiently equal to the length of the belt 100. When the shape memory alloys 102a, 102b, and 102c reach the phase transition temperature, they will have a first original shape, a second original shape, and a third original shape respectively, wherein the first original shape, the second original shape, and the third original shape have different curve angles respectively.

The detecting module 108 is used to detect whether the belt structure 1' is close to an object under wrapping, and generate the triggering signal when a distance between the belt structure 1' and the object is smaller than a threshold value. Therefore, the processing module 104 generates the driving signal according to the triggering signal. The detecting module 108 is, for example, a proximity sensor. The proximity sensor determines the distance between the object and the belt structure 1' by detecting the difference in magnetic field. Alternately, the detecting module 108 is, for example, an infrared sensor, a laser sensor, an ultrasonic sensor, an optic sensor, or other distance detecting sensors, but the disclosure is not limited thereto.

The input module 110 is used to input a parameter related to an external diameter of the object under wrapping, and to generate the triggering signal according to the external diameter. The input module 110 is, for example, a switch, a knob, a button, or a touch screen. Users can manually input information about the desired size of the object under wrapping, and then the driving module 106 generates the corresponding driving current according to the parameters the users set. Therefore, users can configure the driving module 106 by using the input module 110 to provide the shape memory alloy with the current magnitude of the driving current or the period of time in which the driving current is provided by the driving module 106.

The switch module 112 is used to enable the current path between the driving module 106 and the shape memory alloy 102a, the driving module 106 and the shape memory alloy 102b, or the driving module 106 and the shape memory alloy 102c. In other words, the switch module 112 is a switch and is controlled by the processing module 104, so that the switch module 112 can execute the switch function according to the control signal generated by the processing module 104.

Figure 5A:
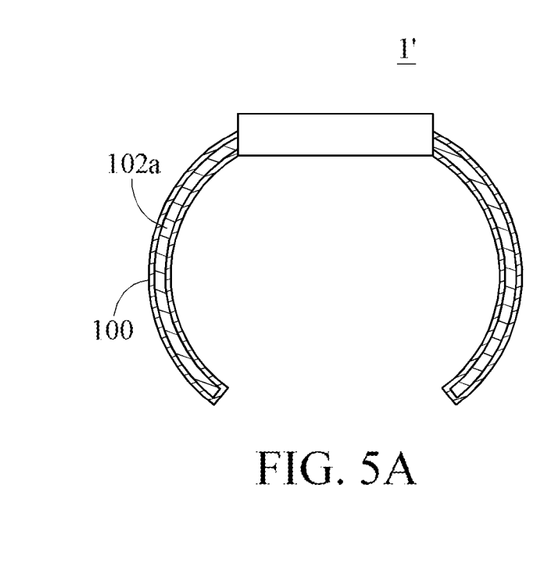
FIG. 5A to FIG. 5C are lateral cross-sectional views of the belt structure in FIG. 4 deformed.
Figure 5B:
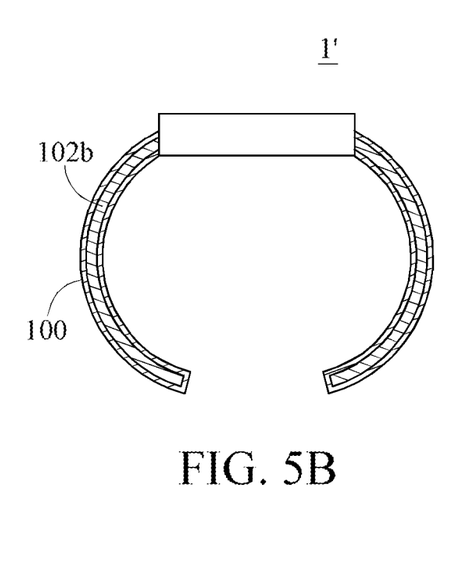
Figure 5C:
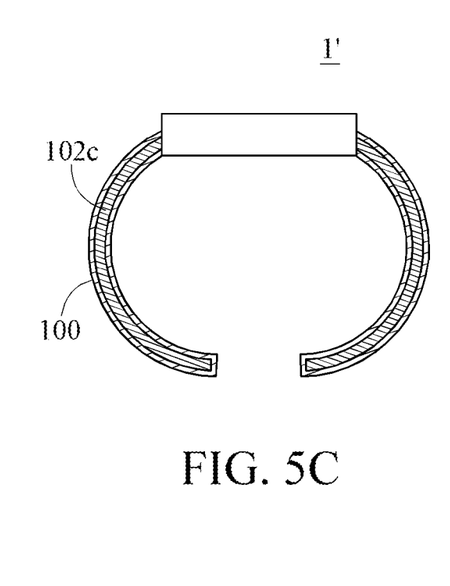

Referring to FIG. 5A to FIG. 5C, FIG. 5A to FIG. 5C are lateral cross-sectional views of the belt structure in FIG. 4 deformed. When the switch module 112 is controlled by the processing module 104 to enable the current path between the driving module 106 and the shape memory alloy 102a and the driving module 106 starts delivering the driving current to the shape memory alloy 102a, the temperature of the shape memory alloy 102a may rise. When the temperature of the shape memory alloy 102a reaches the phase transition temperature, the shape memory alloy 102a may return back to the first original shape, as shown in FIG. 5A.

Similarly, when the driving module 106 delivers the driving current to the shape memory alloy 102b or 102c through the switch module 112, the shape memory alloy 102b returns back to the second original shape, as shown in FIG. 5B, or the shape memory alloy 102c returns back to the third original shape, as shown in FIG. 5C. Therefore, the belt structure 1' can be adjusted to fit objects with different size through the operation among the switch module 112 and the shape memory alloys 102a, 102b, and 102c, which have different original shapes.

Figure 6:
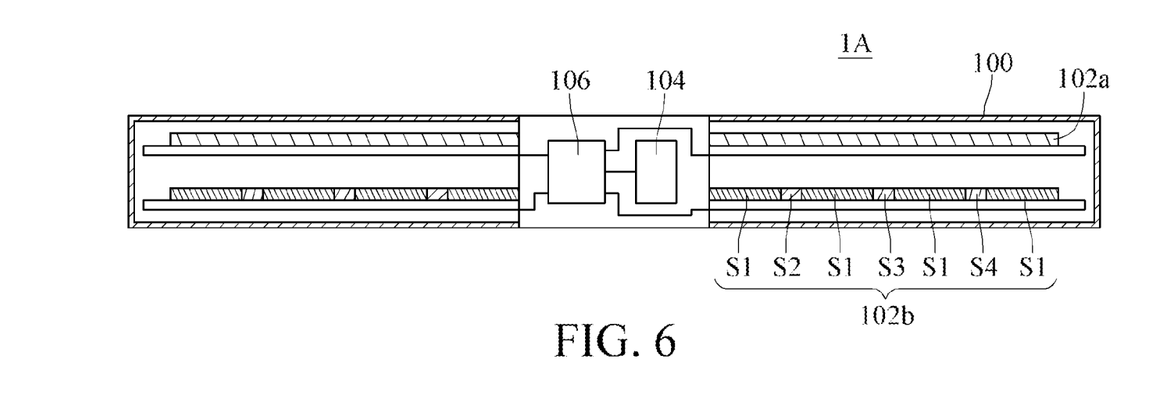
FIG. 6 is a vertical view of a belt structure in an embodiment of the disclosure.

Referring to FIG. 6, FIG. 6 is a vertical view of a belt structure in an embodiment of the disclosure. As shown in FIG. 6, the belt structure 1A comprises a belt 100, a shape memory alloy 102a, a shape memory alloy 102b, a processing module 104, and a driving module 106, wherein the driving module 106 is electrically connected with the processing module 104, and the shape memory alloys 102a and 102b. Since most of the components of the belt structure 1A are similar to those of the belt structures 1 and 1' described above, the detailed information of the belt structure 1A will not be repeated below.

Compared with the belt structures 1 and 1', the shape memory alloy 102b of the belt structure 1A is a multi-section memory alloy (or called as multi-memory alloy) made of adjustable multi-section memory material (or called as multi-memory material). To clearly illustrate this embodiment, the shape memory alloy 102b will be renamed to the multi-section memory alloy 102b below.

In this embodiment, the length of the shape memory alloy 102a and the length of the multi-section memory alloy 102b are sufficiently equal to the length of the belt 100. The multi-section memory alloy 102b may comprise first sections S1, a second section S2, a third section S3, and a fourth section S4, wherein the first sections S1, the second section S2, the third section S3, and the fourth section S4 are separated from each other in the multi-section memory alloy 102b. The first section S1 has a bigger proportion than the second section S2, the third section S3, and the fourth section S4 in the multi-section memory alloys 102b, that is, a quantity of the first sections S1 is larger than quantities of the second section S2, the third section S3, and the fourth section S4, but is not limited thereto.

The first section S1, the second section S2, the third section S3, and the fourth section S4 in the multi-section memory alloys 102b respectively have different phase transition temperatures. In other words, the temperatures to enable the first section S1, the second section S2, the third section S3, and the fourth section S4 to return back to their original shapes are different. In one of exemplary embodiments, the manufacturers of the multi-section memory alloy 102b may design the phase transition temperatures of the second section S2, the third section S3, and the fourth section S4 through laser. In other words, the second section S2, the third section S3, and the fourth section S4 can be determined as process nodes. Since this technology of process nodes should be familiar to the people in the related art, it will not be illustrated hereinafter. The phase transition temperature of the shape memory alloy 102a is smaller than or equal to the phase transition temperature of the first section S1 of the multi-section memory alloy 102b. Furthermore, the disclosure has no limitations on the quantity, phase transition temperature and original shape of each section of the multi-section memory alloy 102b.

Figure 7A:
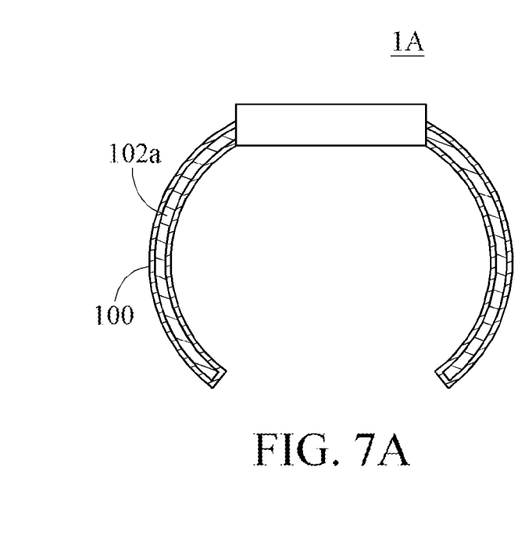
FIG. 7A to FIG. 7C are lateral cross-sectional views of the belt structure in FIG. 6 deformed.
Figure 7B:
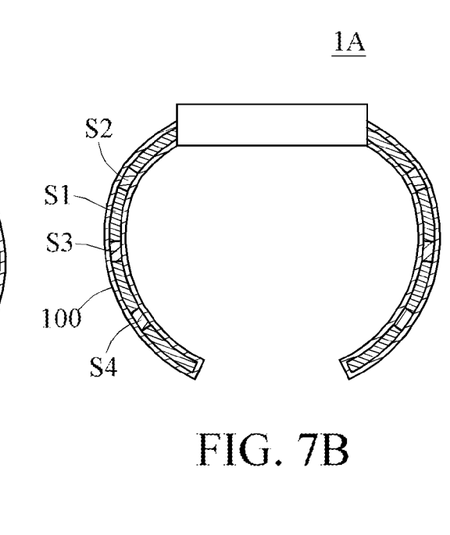
Figure 7C:
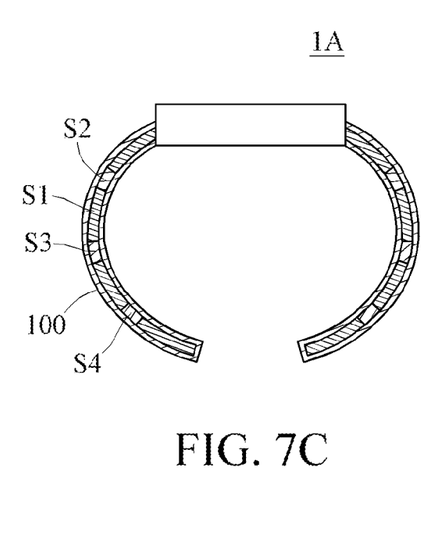

Referring to FIG. 7A to FIG. 7C, FIG. 7A to FIG. 7C are lateral cross-sectional views of the belt structure in FIG. 6 deformed. The phase transition temperature of the shape memory alloy 102a is equal to the phase transition temperature of the first section S1 of the multi-section memory alloy 102b. Thus, when the driving module 106 continuously delivers the driving current to the shape memory alloy 102a and the multi-section memory alloy 102b, the shape memory alloy 102a and the multi-section memory alloy 102b will be heated. When the temperatures of the shape memory alloy 102a and the multi-section memory alloy 102b reach the phase transition temperature of the shape memory alloy 102a (i.e. the phase transition temperature of the first section S1), the shape memory alloy 102a and the first section S1 of the multi-section memory alloy 102b will return back to their original shapes. At this point, the second section S2, the third section S3, and the fourth section S4 of the multi-section memory alloy 102b may be affected by the deformation of the shape memory alloy 102a to be deformed. The curve angle of the belt 100 may depend on the shape memory alloy 102a, as shown in FIG. 7A.

In other words, the shape memory alloy 102a of the embodiment is used to control the original shape of the belt 100 so that the multi-section memory alloy 102b will not have different curve directions when the second section S2, the third section S3, and the fourth section S4 have not yet reached their phase transition temperatures.

Subsequently, when the driving current is continuously delivered to the multi-section memory alloy 102b and the temperature of the multi-section memory alloy 102b reaches the phase transition temperature of the second section S2, the second section S2 will return back to its original shape and the shapes of the third section S3 and the fourth section S4 will not be changed, as shown in FIG. 7B. When the temperature of the multi-section memory alloy 102b reaches the phase transition temperature of the third section S3, the third section S3 will return back to its original shape and the shape of the fourth section S4 will not be changed, as shown in FIG. 7C. In this way, the rest can be deduced by analogy. Therefore, with the different sections of the multi-section memory alloy 102b having different phase transition temperatures, the belt structure 1A of the embodiment may securely wrap around the object gradually. The accuracy of the deformation of the belt 100 in order to wrap around the object will depend on the quantity and phase transition temperatures of process nodes of the multi-section memory alloy 102b.

Figure 8:
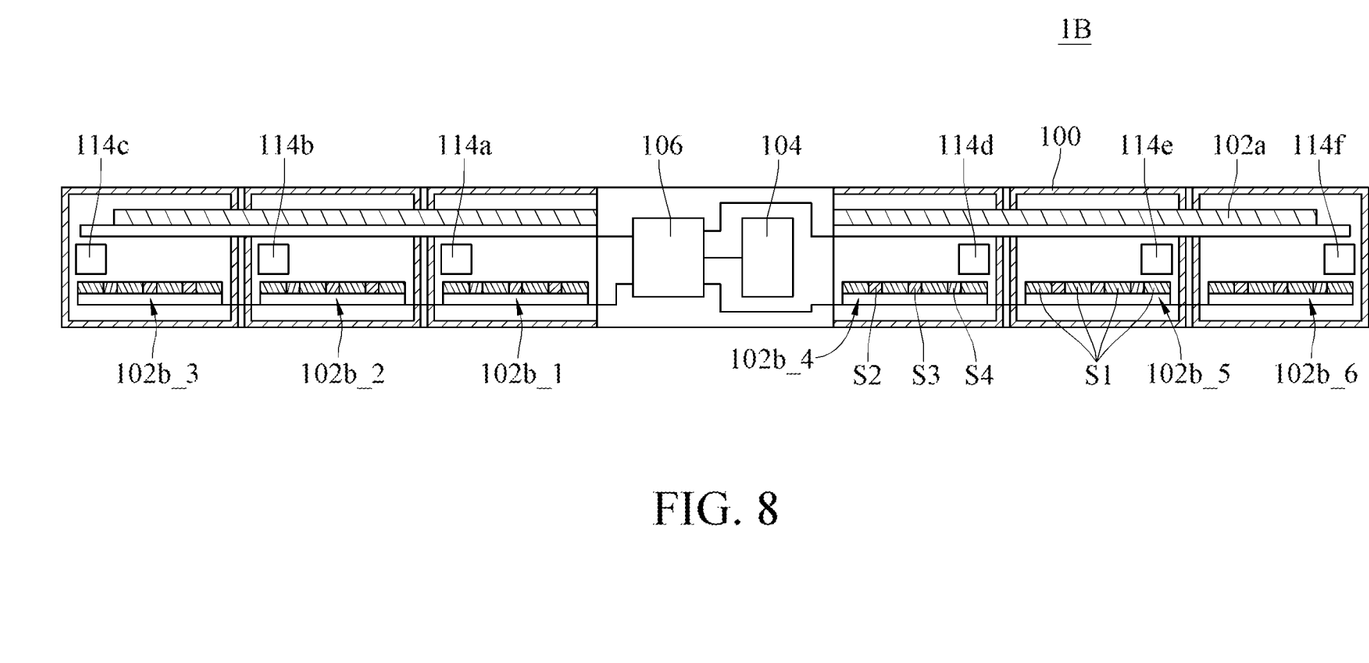
FIG. 8 is a vertical view of a belt structure in an embodiment of the disclosure.

Referring to FIG. 8, FIG. 8 is a vertical view of a belt structure in an embodiment of the disclosure. As shown in FIG. 8, the belt structure 1B comprises a belt 100, a shape memory alloy 102a, multi-section memory alloys 102b_1 to 102b_6, a processing module 104, a driving module 106, and pressure detectors 114a to 114f, wherein the processing module 104 is electrically connected to the driving module 106 and the pressure detectors 114a to 114f; and the driving module 106 is electrically connected to the shape memory alloy 102a and the multi-section memory alloys 102b_1 to 102b_6. Since the belt structure 1B of this embodiment is similar to the belt structure 1A, the details of the belt structure 1B will not be repeated below.

Compared with the belt structure 1A of the previous embodiment, the multi-section memory alloys 102b_1 to 102b_6 of the belt structure 1B of this embodiment are serially disposed in the belt 100. The sum of lengths of the multi-section memory alloys 102b_1 to 102b_6 is sufficiently equal to the length of the belt 100. Since the multi-section memory alloys 102b_1 to 102b_6 are similar to the multi-section memory alloy 102b in the previous embodiment, they will not be illustrated hereinafter.

The locations of the pressure detectors 114a to 114f correspond to the locations of the multi-section memory alloys 102b_1 to 102b_6 respectively. For example, the location of the pressure detector 114a corresponds to the location of the multi-section memory alloy 102b_1; the location of the pressure detector 114b corresponds to the location of the multi-section memory alloy 102b_2; and the reset can be deduced by analogy. The pressure detectors 114a to 114f are used to detect whether they contact the object or not. When one pressure detector detects that it contacts the object, this pressure detector will generate a pressure value so that the processing module 104 can control whether the driving module 106 delivers the driving current to the corresponding multi-memory alloy, according to the pressure value.

Also, the belt structure 1B of the embodiment further comprises a switch module (not shown in the drawing). The switch module is electrically connected between the driving module 106 and the multi-section memory alloys 102b_1 to 102b_6. The switch module is used to selectively enable a current path between the driving module 106 and at least one of the multi-section memory alloys 102b_1 to 102b_6. For example, the switch module may only enable the current path between the driving module 106 and the multi-section memory alloy 102b_1 for a certain period of time. Alternately, the switch module may enable the current paths between the driving module 106 and the multi-section memory alloys 102b_1 and 102b_4 at the same time, but the disclosure is not limited thereto.

Figure 9A:
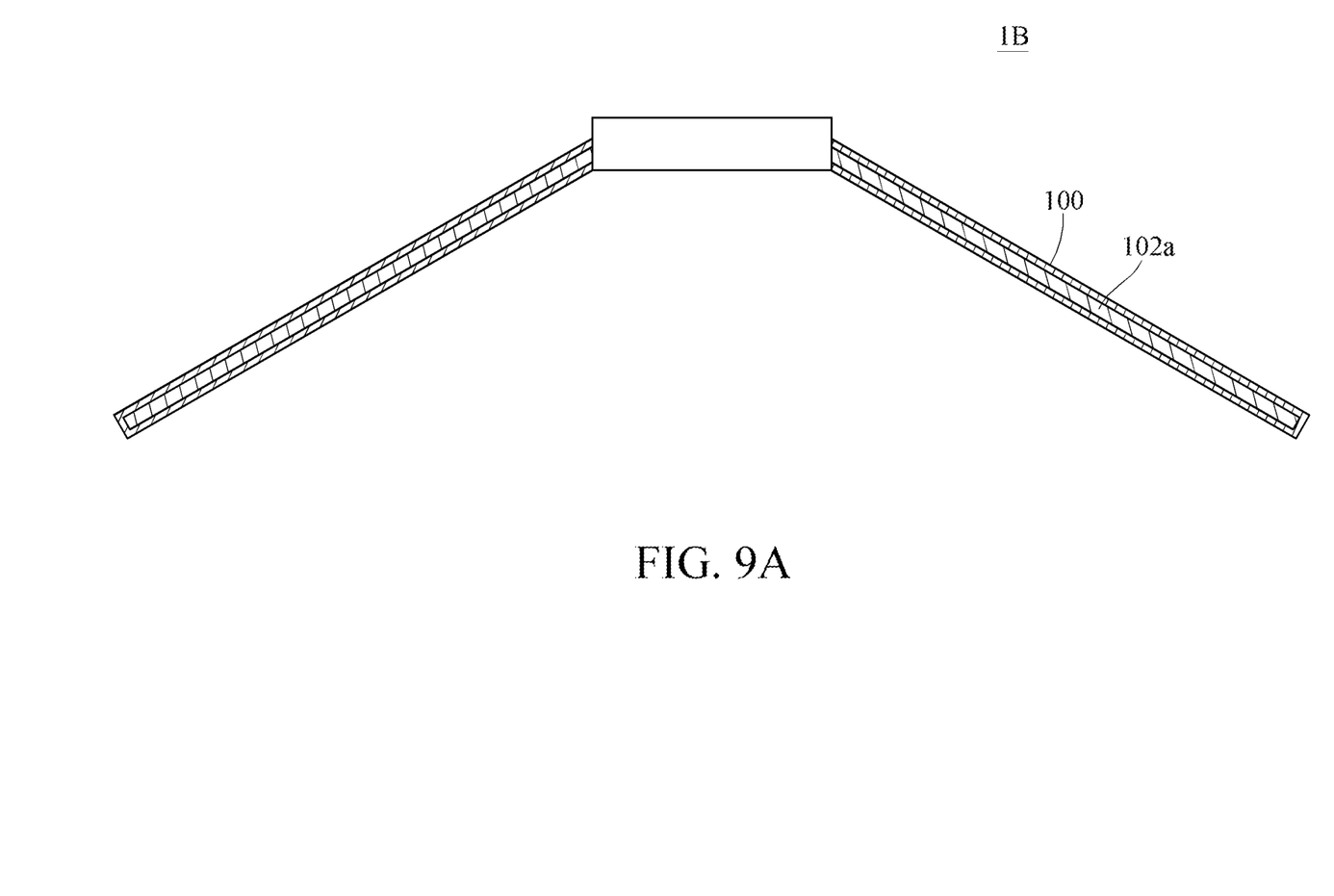
FIG. 9A to FIG. 9B are lateral cross-sectional views of the belt structure in FIG. 8 deformed.
Figure 9B:
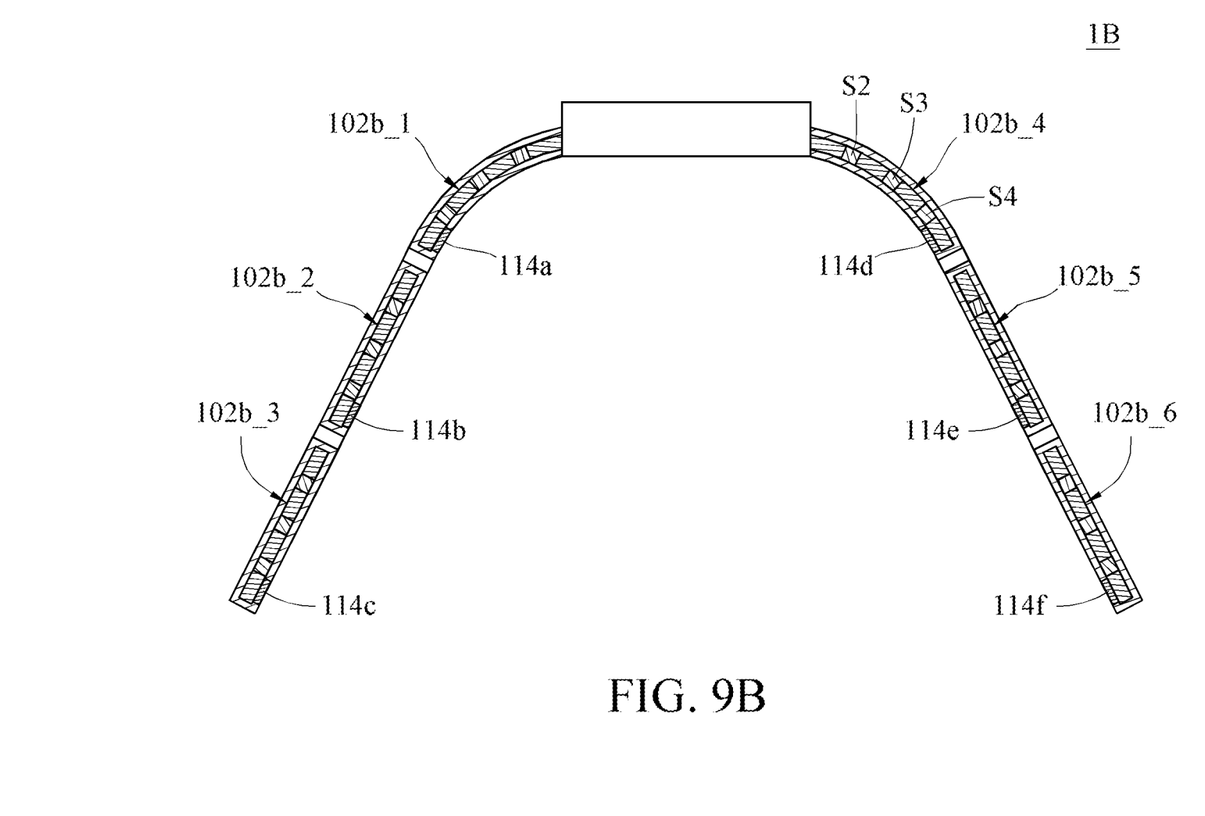

Referring to FIG. 9A and FIG. 9B, FIG. 9A to FIG. 9B are lateral cross-sectional views of the belt structure in FIG. 8 deformed. The phase transition temperature of the shape memory alloy 102a is equal to the phase transition temperature of the first sections S1 of the multi-section memory alloys 102b_1 to 102b_6. The driving module 106 will simultaneously deliver the driving current to two of the multi-section memory alloys, corresponding to each other, for example, the multi-section memory alloys 102b_1 and 102b_4, the multi-section memory alloys 102b_2 and 102b_5, or the multi-section memory alloys 102b_3 and 102b_6.

Therefore, when the driving module 106 continuously delivers the driving current to the shape memory alloy 102a and the multi-section memory alloys 102b_1 and 102b_4, the shape memory alloy 102a and the multi-section memory alloy 102b_1 and 102b_4 will be heated. When the temperatures of the shape memory alloy 102a and the multi-section memory alloys 102b_1 and 102b_4 reach the phase transition temperature of the shape memory alloy 102a (i.e. the phase transition temperature of the first sections S1 of the multi-section memory alloys 102b_1 and 102b_4), the shape memory alloy 102a and the first sections S1 of the multi-section memory alloys 102b_1 and 102b_4 will return back to their original shapes. At this point, the shape of the belt 100 will be like the one shown in FIG. 9A due to the shape memory alloy 102a returning to its original shape.

Moreover, when the driving current is continuously delivered to the multi-section memory alloys 102b_1 and 102b_4, and the temperatures of the multi-section memory alloys 102b_1 and 102b_4 reach the phase transition temperatures of the second section S2, the third section S3, and the fourth section S4 in sequence, the second section S2, the third section S3, and the fourth section S4 will return back to their original shapes sequentially.

When the multi-section memory alloys 102b_1 and 102b_4 are being heated and then the second section S2, the third section S3, and the fourth section S4 return back to their original shapes, the pressure detectors 114a and 114d will continuously detect whether the sections of the belt 100 corresponding to the pressure detectors 114a and 114d contacts the object (e.g. user's extremity) or not. When the pressure value generated by the pressure detector 114a or 114d is larger than the threshold value, the corresponding pressure detector (the pressure detector 114a or 114d) will generate a triggering signal according to which the processing module 104 can control the driving module 106 to stop delivering the driving current to the multi-section memory alloys 102b_1 and 102b_4 and then start delivering the driving current to the multi-section memory alloys 102b_2 and 102b_5. In this way, the rest can be deduced by analogy. Thus, the multi-section memory alloys 102b_1 to 102b_6 of the belt structure 1B of this embodiment can be deformed step by step because of the detection results of the pressure detectors 114a to 114f, and then the belt structure 1B may appropriately wrap around objects with any kind of shapes and sizes.

In summary, the present disclosure provides a belt structure in which shape memory alloys are disposed in a belt, strap or bracelet. When the processing module in the belt structure can provide a driving signal to the shape memory alloys, the shape memory alloys will be deformed according to the corresponding driving signal. Moreover, the shape memory alloy may even be a multi-section memory alloy so that the belt can wrap around objects with any kind of shapes and sizes. On the other hand, the belt structure can further include pressure detectors, the multi-section memory alloys corresponding to the pressure detectors can be deformed according to the detection results of the pressure detectors, so as to increase the comfort of wearing the belt for users. Therefore, when the belt structure of the disclosure is applied to a wearable device, without manually adjusting the belt, the belt automatically adjusts to the most suitable size to achieve the best comfort for users to wear.

Even though the disclosure is illustrated with the embodiments above, the embodiments are not to have any limitations on the disclosure. The claims of the disclosure are described below.

What is claimed is:

1. A belt structure, comprising:
   a belt;
   a first shape memory alloy, disposed in the belt;
   a processing module, configured to generate a control signal according to a triggering signal;
   a driving module, electrically connected to the processing module, and configured to generate a driving signal according to the control signal, and provide the driving signal to the first shape memory alloy so that the first shape memory alloy is deformed; and
   a detecting module, electrically connected to the processing module, and configured to detect whether the belt structure is close to an object, and generate the triggering signal when a distance between the belt structure and the object is smaller than a threshold value.

2. The belt structure according to claim 1, further comprising:
   an input module, electrically connected to the processing module, and configured to configure an external diameter of an object that the belt structure intends to circle around, and to generate the triggering signal according to the external diameter.

3. The belt structure according to claim 1, wherein the driving module is a magnetic field generator, the magnetic field generator generates magnetic force of different directions, and enables the first shape memory alloy to be deformed due to the change of direction of the magnetic force.

4. The belt structure according to claim 1, wherein the driving module is a current driver, the driving signal is a driving current, and the current driver delivers the driving current to the first shape memory alloy so that the first shape memory alloy is heated and deformed.

5. The belt structure according to claim 4, further comprising:
   a second shape memory alloy, disposed in the belt and separating from the first shape memory alloy, wherein a length of the first shape memory alloy and a length of the second shape memory alloy sufficiently equal to a length of the belt, and when a temperature of the first shape memory alloy and of the second shape memory alloy reach a phase transition temperature, the first shape memory alloy has a first initial shape and the second shape memory alloy has a second initial shape.

6. The belt structure according to claim 5, further comprising:
   a switch module, electrically connected to the driving module, the first shape memory alloy, and the second shape memory alloy, and configured to selectively enable a current path between the driving module and the first shape memory alloy or a current path between the driving module and the second shape memory alloy.

7. The belt structure according to claim 4, wherein the first shape memory alloy is a multi-section memory alloy, a length of the multi-section memory alloy sufficiently equals to a length of the belt, the multi-section memory alloy at least comprises a first section and a second section, the first section has a first initial shape when a temperature of the first section reaches a first phase transition temperature, the second section has a second initial shape when a temperature of the second section reaches a second phase transition temperature, and the second phase transition temperature is bigger than the first phase transition temperature.

8. The belt structure according to claim 7, further comprising:
a second shape memory alloy, disposed in the belt and separating from the multi-section memory alloy, wherein a length of the second shape memory alloy sufficiently equals to the length of the belt, the second shape memory alloy has a third initial shape when a temperature of the second shape memory alloy reaches a third phase transition temperature, and the third phase transition temperature is smaller than or equal to the first phase transition temperature.

9. The belt structure according to claim 4, wherein the first shape memory alloy is made of a plurality of multi-section memory alloys, the multi-section memory alloys are connected serially in the belt, a sum of lengths of the multi-section memory alloys sufficiently equals to a length of the belt, each of the multi-section memory alloys at least comprises a first section and a second section, the first section has a first initial shape when a temperature of the first section reaches a first phase transition temperature, the second section has a second initial shape when a temperature of the second section reaches a second phase transition temperature, and the second phase transition temperature is higher than the first phase transition temperature.

10. The belt structure according to claim 9, further comprising:
a second shape memory alloy, disposed in the belt and separating from the multi-section memory alloys, wherein a length of the second shape memory alloy sufficiently equals to the length of the belt, the second shape memory alloy has a third initial shape when a temperature of the second shape memory alloy reaches a third phase transition temperature, and the third phase transition temperature is smaller than or equal to the first phase transition temperature.

11. The belt structure according to claim 9, further comprising:
a plurality of pressure detectors, electrically connected to the processing module, wherein locations of the pressure detectors correspond to locations of the multi-section memory alloys respectively, when the driving module delivers the driving current to one of the multi-section memory alloys, the pressure detector that corresponds to the one of the multi-section memory alloys will detect whether the belt contacts an object or not, when the pressure detector detects that the belt contacts the object, the driving module stops the delivery of the driving current to the multi-section memory alloy, and starts delivering the driving current to another of the multi-section memory alloys.

12. The belt structure according to claim 11, further comprising:
a switch module, electrically connected between the driving module and the multi-section memory alloys, and configured to selectively enable a current path between the driving module and at least one of the multi-section memory alloys.

* * * * *